(12) United States Patent
Kallevig

(10) Patent No.: US 6,375,405 B1
(45) Date of Patent: Apr. 23, 2002

(54) AUTOMATIC ATTACHMENT ADAPTER

(75) Inventor: Bruce E. Kallevig, Monticello, MN (US)

(73) Assignee: Kaltec of Minnesota, Plymouth, MN (US)

( * ) Notice: Subject to any disclaimer, the term of this patent is extended or adjusted under 35 U.S.C. 154(b) by 0 days.

(21) Appl. No.: 09/598,876

(22) Filed: Jun. 21, 2000

Related U.S. Application Data
(60) Provisional application No. 60/141,075, filed on Jun. 25, 1999.

(51) Int. Cl.[7] .................................................. E02F 9/00
(52) U.S. Cl. ........................ 414/723; 414/686; 37/468; 172/272
(58) Field of Search ................................ 414/722, 723, 414/686; 37/468; 403/321, 325; 172/272–275

(56) References Cited

U.S. PATENT DOCUMENTS

| | | | |
|---|---|---|---|
| 4,113,029 A | | 9/1978 | Ramsower .................... 414/722 |
| 4,984,958 A | * | 1/1991 | Kaczmarczyk .............. 414/723 |
| 4,986,722 A | * | 1/1991 | Kacmarczyl et al. ........ 414/723 |
| 5,098,252 A | | 3/1992 | Sheesley et al. ............. 414/723 |
| 5,360,313 A | | 11/1994 | Gilmore, Jr. et al. ........ 414/722 |
| 5,387,075 A | * | 2/1995 | Aoki ........................... 414/723 |
| 5,423,625 A | * | 6/1995 | Bobauer et al. ............. 414/723 |
| 5,549,440 A | * | 8/1996 | Cholakon et al. ........... 414/723 |
| 5,584,644 A | * | 12/1996 | Droegemueller ............. 414/723 |
| 5,692,325 A | * | 12/1997 | Kuzutani ..................... 414/723 |
| 5,836,734 A | | 11/1998 | Doering ....................... 414/723 |

* cited by examiner

Primary Examiner—Eileen D Lillis
Assistant Examiner—Paul T. Chin
(74) Attorney, Agent, or Firm—Patterson, Thuente, Skaar & Christensen, P.A.

(57) ABSTRACT

An automatic attachment adapter adapted for coupling attachments to and uncoupling attachments from loader lift arms without the need for the operator to exit the equipment or employ a helper. The automatic attachment adapter employs a compact, lightweight, high strength latching device to make connection between the attachment plate of the loader and mounting plate of the attachment. By making use of interlocking rotating clevises the latching device is self-centering, requiring only approximate alignment to operate. Additionally, the latching mechanism is self cleaning of debris which may interfere with its operation.

30 Claims, 4 Drawing Sheets

AUTOMATIC ATTACHMENT ADAPTER

RELATED APPLICATION

This application claims the benefit of Provisional Application No. 60/141,075 filed on Jun. 25, 1999, which is incorporated herein in its entirety by reference.

FIELD OF THE INVENTION

The invention relates to adapters for connecting attachments to moving or lifting machinery. More particularly, the invention relates to an attachment plate and locking mechanism for securing attachments to construction equipment such as a skid steer loader.

BACKGROUND OF THE INVENTION

A wide variety of versatile motorized mobile base power units are used in the construction, maintenance, and grounds-upkeep industries. These include skid steer loaders, light tractors and other compact power units. Skid steer loaders, in particular, are widely employed for a variety of material handling, earth moving, and transportation tasks.

In general, these devices are favored for their compact size, maneuverability and versatility. The versatility of these units is largely dependent upon their ability to use a wide variety of available attachments. The variety of available attachments is enormous. Attachments include buckets, grapples, tree spades, backhoes and many others.

These attachments are interchangeable by virtue of a universal mounting plate on the attachment which is securable to an attachment plate on the lift arms of any given loader. Currently available attachment plates engage the attachment mounting plate by placing a beveled upper edge beneath a downward-angled flange on the mounting plate. Once the beveled edge is engaged under the downward-angled flange, a latching mechanism is secured to releasably attach the mounting plate to the attachment plate.

The latching mechanisms of currently available attachment plates are manually operated, and in general, engage a series of sliding bolts or pins on the attachment plate into a mating series of holes on the mounting plate. Thus, it is necessary for the operator of the equipment to shut down the equipment, exit the operator's position, and engage the latching mechanism manually, or to employ a helper to engage the latching mechanism manually. This situation creates a safety risk for the operator or helper, in that they must enter the operational area of the equipment while engaging the latching mechanism. The pins or bolts employed in these latching mechanisms are large and heavy in order to bear the substantial load stresses involved in operating the attachment. Additionally, precise alignment of the attachment plate and the mounting plate is required in order to engage the pins or bolts into their mating holes. If precise alignment is not achieved by manipulating the lift arms of the loader when engaging the attachment plate to the mounting plate, it is sometimes necessary for the operator or helper to manually shift the attachment, creating inconvenience and further safety risk.

Further, construction equipment is operated in an environment filled with dirt and debris. Items of dirt and debris may become lodged in the attachment latching mechanism, interfering with its operation. If this occurs the mechanism must often be cleaned manually, creating delay and inconvenience.

When it is desired to remove an attachment from the loader, it is necessary once again for the operator or helper to enter the operational area to manually disengage the latching mechanism, again creating inconvenience and a potential safety risk. It would be desirable to have an attachment plate and latching mechanism that is self-centering, requiring only approximate alignment with the mounting plate, and self-engaging, eliminating the need for manual intervention to latch the attachment plate to the mounting plate. In addition, it would be desirable to increase convenience and economy by making the attachment plate releasable without the need to employ a helper or for the operator to shut down and exit the machinery in order to release the attachment from the attachment plate of the loader. Further a self cleaning latching mechanism would be very helpful.

SUMMARY OF THE INVENTION

The present invention is an automatic attachment adapter which provides for safe, solo operation in the connection and removal of attachments from a skid steer loader or the like. The automatic attachment adapter employs a compact, lightweight, high strength latching device to make connection between the attachment plate of the loader and mounting plate of the attachment. Further, the latching device is self-centering, requiring only approximate alignment to operate. In addition, there is no need to enter the operational area of the equipment for manual engagement or disengagement of the latching mechanism, which creates a safer, more efficient, and more economical work environment.

This system employs a mounting plate on the attachment which has at its upper edge a downward-angled flange. Near the lower edge, it employs at least one pin to which the latching mechanism of the mating attachment plate engages. The attachment plate on the lift arms of the loader includes an angled upper edge for engaging the angled flange of the mounting plate and at least one latching mechanism which engages the pin on the mounting plate of the attachment.

The latching mechanism comprises a body housing and two rotating clevises which rotate on posts within the body housing. Each rotating clevis has a mouth, defined by an inner jaw and an outer jaw. The rotating clevises are able to be fully opened or to engage in one of two locking positions when closing. When open, the mouths of the paired rotating clevises overlap providing a relatively wide receiving area for receiving a mating pin for engagement. Once the engaging pin is in the receiving area, the rotating motion of the paired rotating clevises tends to force the pin to a centered location, creating a self-centering latch mechanism.

As the pin self-centers between the rotating clevises, the rotating clevises tend to close with relation to each other, achieving a first locked position, at which point the pin cannot be disengaged without unlocking the rotating clevises. Further travel inward reaches a second locked position, at which the mouths of the rotating clevises are fully meshed and the pin is engaged with great strength. This intermeshing of the rotating connectors creates a high-strength attachment between the attachment plate of the loader lift arms and the mounting plate on the attachment.

It is notable that once the beveled upper edge of the attachment plate is engaged beneath the angled flange of the mounting plate, the natural lifting motion of engaging the attachment causes the pins on the mounting plate to engage the latching mechanism rotating clevises, which encourages automatic engagement of the pins by the latching mechanism.

When it is desired to release the attachment from the loader, the latching mechanism can be remotely disengaged.

The latching mechanism is well adapted to be disengaged by any of a variety of remote operating mechanisms. These mechanisms include a simple cable release, pneumatic mechanisms, hydraulic mechanisms, and electric servomotor or solenoid mechanisms.

The latch mechanism is self cleaning. The rotating clevises are biased to an open position by springs or other biasing means. The opening motion of the latching mechanism tends to push debris out of the housing thus clearing it out of the mouths of the rotating clevises.

DETAILED DESCRIPTION OF THE INVENTION

Figure 1A:
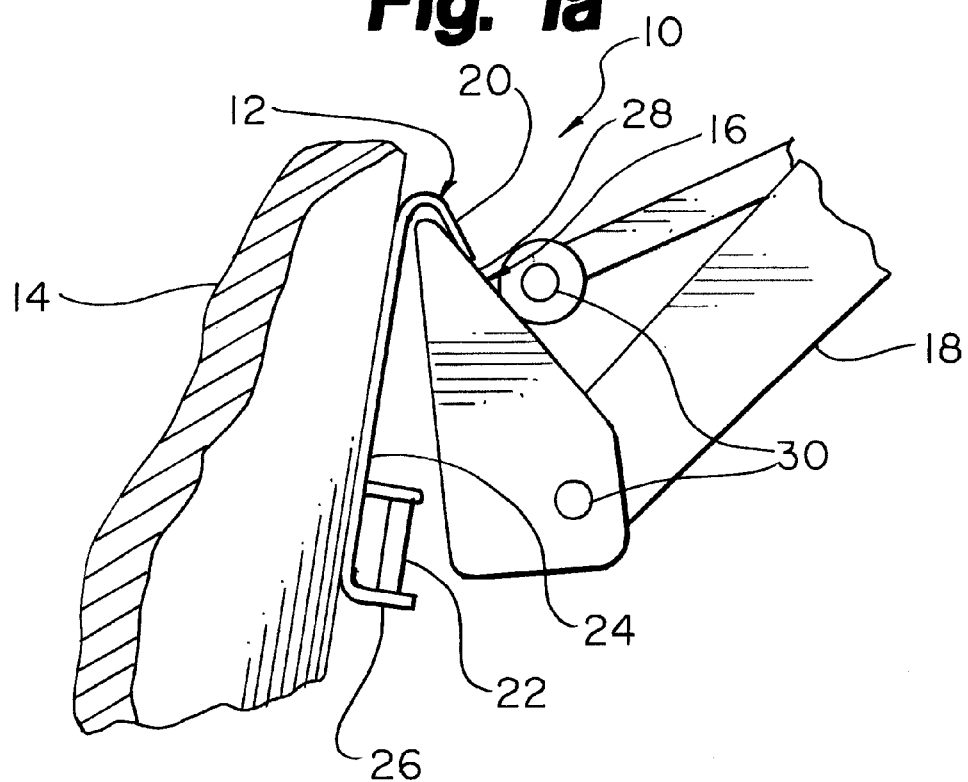
FIG. 1a is a side elevational view of an attachment plate of a loader beginning to engage the mounting plate of an attachment in accordance with the present invention.
Figure 1B:
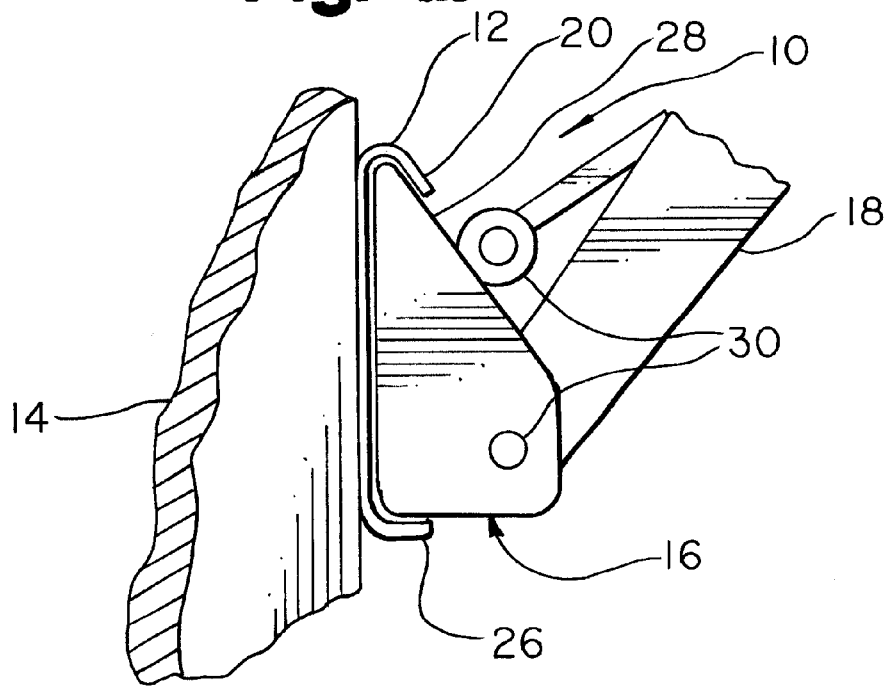
FIG. 1b is a side elevational view of the attachment plate and mounting plate fully engaged.

Referring to FIGS. 1a and 1b, an automatic attachment adapter 10 is adapted for connection to a mounting plate 12 secured to an attachment 14. The adapter 10 is carried by attachment plate 16 secured to loader lift arms 18. FIG. 1a depicts the mounting plate 12 and attachment plate 14 in a pre-engaged position. FIG. 1b depicts them in a fully engaged position.

Mounting plate 12 comprises a downward angled upper flange 20, at least one engagement pin 22 and a lower flange 26. Engagement pin 22 is operably connected to the back side 24 of mounting plate 12 and lower flange 26.

Attachment plate 16 comprises an angled upper edge 28 adapted to fit beneath upper flange 20, connection pivot axes 30 to loader lift arms 18. At least one automatic latching device 32 is carried by the attachment plate 16.

Figure 2A:
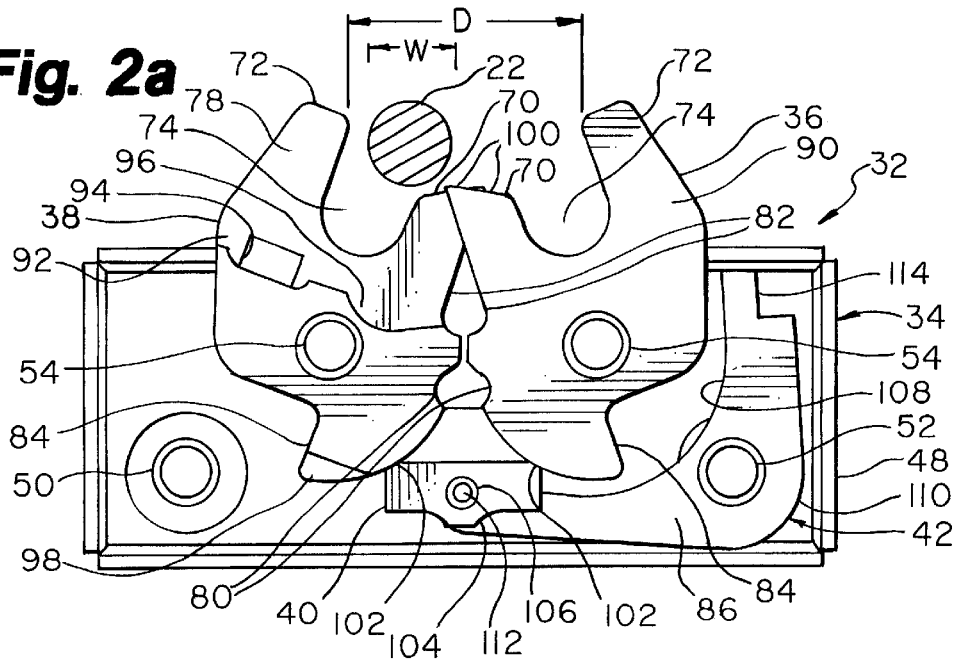
FIG. 2a is a top plan view of a latching mechanism in the open position with the cover removed in accordance with the present invention, springs are not shown for clarity.
Figure 2B:
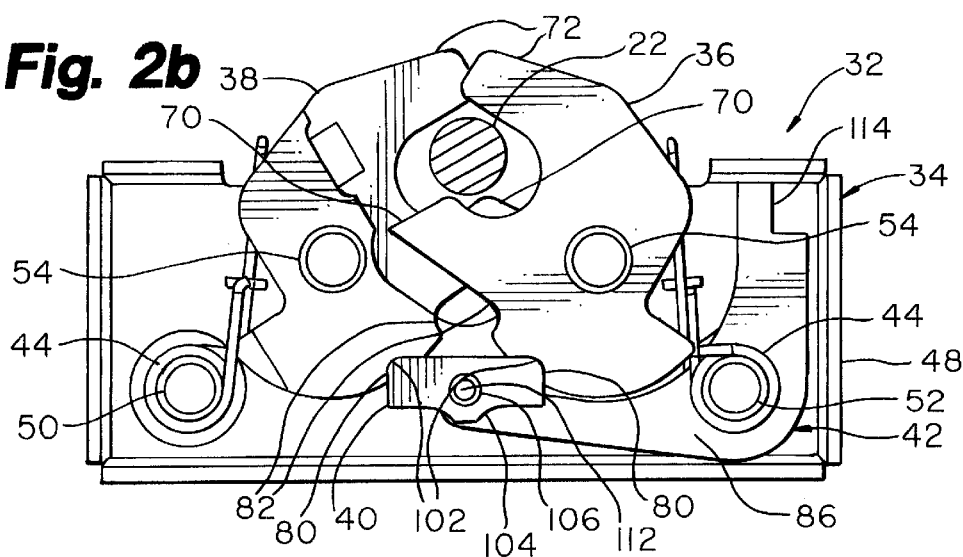
FIG. 2b is similar to FIG. 2a but with the latching mechanism in the first locked position.
Figure 2C:
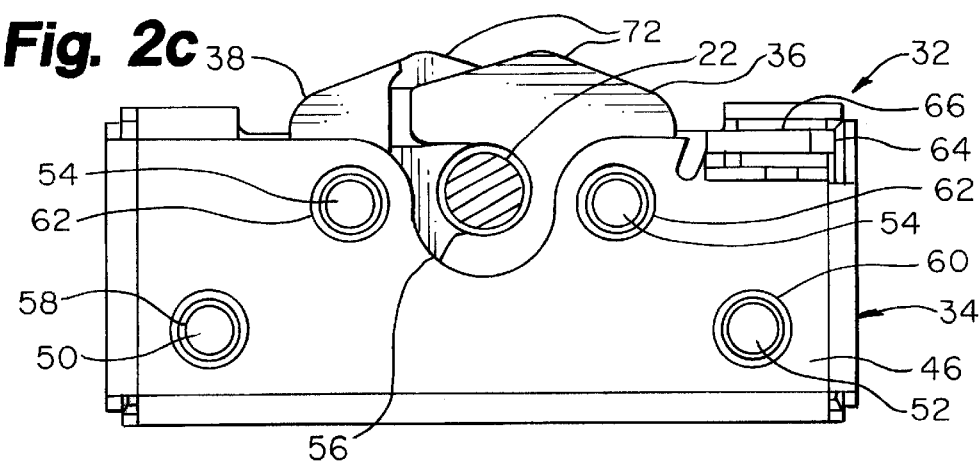
FIG. 2c is a top plan view of a latching mechanism in the second locked position with the cover in place.

Referring to FIGS. 2a, 2b and 2c an automatic latching device 32 generally includes: a housing 34, an upper rotating clevis 36, a lower rotating clevis 38, a locking block 40, a locking block release mechanism 42 and springs 44.

Figure 3:
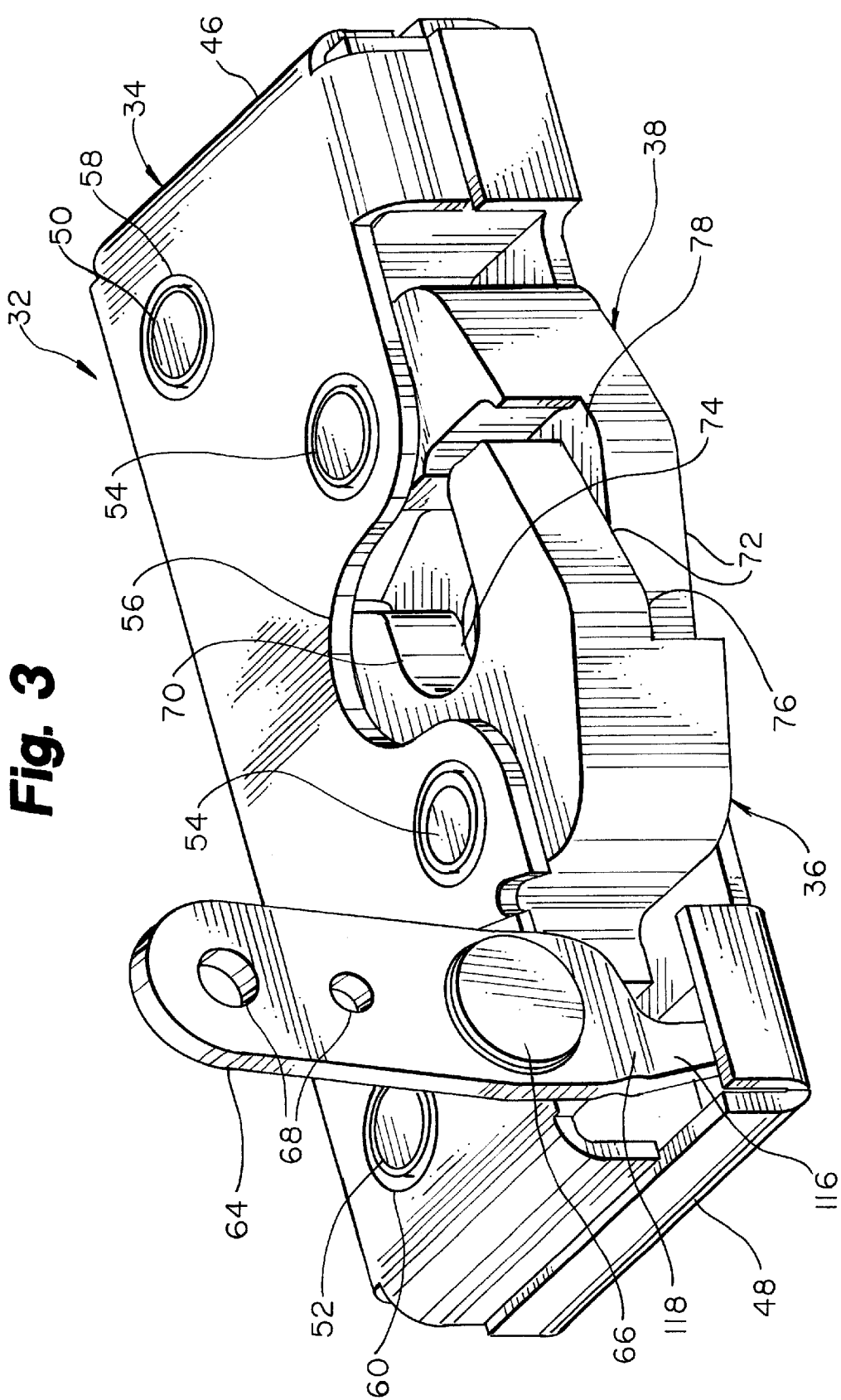
FIG. 3. is a perspective view of a latching mechanism in the second locked position.

The housing 34 includes a top portion 46 and a bottom portion 48. The bottom portion 48 supports spring pivot posts 50, 52 and rotating clevis pivot posts 54. The bottom portion 48 also presents an engagement pin receiving bay 56. The top portion 46 is generally a mirror image mate to the bottom portion 48, but presents bay 56 along with post receiving apertures 58, 60 and 62 aligned with spring pivot posts 50, 52 and rotating clevis pivot posts 54, respectively. Referring to FIGS. 2c and 3, the top portion 46 may also include release actuator 64 with release actuator pivot post 66. Release actuator 64 may include remote actuator holes 68.

Remote actuators may include any mechanism capable of applying a linear force to the release actuator 64 at remote actuator holes 68. A remote actuator may also apply a rotational force directly to locking block release mechanism 42. Remote actuators (not shown) may include a cable release, pneumatic mechanisms, hydraulic mechanisms, and electric servomotor or solenoid mechanisms. An optional manual release may be included as well.

Upper rotating clevis 36 and lower rotating clevis 38 are pivotably supported on respective pivot posts 54. Each clevis presents an inner jaw 70 and an outer jaw 72 defining clevis mouths 74. Clevis mouths 74 are U shaped with the semicircular portion of the U closely approximating the diameter D of engagement pin 22.

As depicted in FIG. 3, the inner jaw 70 and outer jaw 72 of upper rotating clevis 36, are milled on their bottom side 76 so that the jaws 70, 72 are about half of the overall thickness of the upper rotating clevis 36. Likewise, the jaws 70, 72 of lower rotating clevis 38 are milled on their top side 78 to about one half the overall thickness of lower rotating clevis 38. Upper rotating clevis 36 and lower rotating clevis 38 each include a first locking notch 80, a second locking notch 82 and a spring receiving surface 84.

The locking block 40 is pivotally coupled to locking block release 42. In one embodiment of the invention, the locking block release 42 takes the form of a bellcrank 86 pivoting on spring pivot post 52. In another embodiment (see FIG. 4), the release 42' takes the form of a ramped slider 88. Other types of locking block releases 42 may be employed without departing from the spirit and scope of the invention.

Referring to FIG. 2a, upper rotating clevis 36 and lower rotating clevis 38 are similar in structure but are oriented so that their upper and lower surfaces are reversed. Each includes a generally flat face 90 and a milled face 92 opposite the flat face 90. The milled face 92 presents a first clearance notch 94, a second clearance notch 96 and a spring clearance cutout 98. The inner jaw 70 of each rotating clevis 36,38 presents an inward bevel 100 preferably of about 30 degrees. Upper rotating clevis 36 and lower rotating clevis 38 are positioned such that when in the open position, inner bevels 100 are substantially superimposed. Inner jaw 70 is dimensioned so that the depth of clevis mouth 74 relative to inner jaw 70 is about equal to diameter D. Outer jaw 72 is somewhat longer so that the depth of clevis mouth 74 exceeds diameter D substantially. Upper rotating clevis 36 and lower rotating clevis 38 each are capable of rotating through an angle greater than about forty five degrees from a closed position to an open position. Preferably, the angle of rotation is greater than about sixty degrees and most preferably about seventy degrees.

Locking block 40 has rounded corners 102 adapted to mate with first locking notches 80 and second locking notches 82. Locking block 40 also presents boss 104 and pivot aperture 106.

Bellcrank 86 presents an inner curve 108, an outer rounded corner 110, a locking block post 112, and release actuator notch 114.

Release actuator 64 further presents bellcrank finger 116 offset by bevel 118.

In operation, referring to FIG. 1a, the angled upper edge 28 of attachment plate 16 is engaged below upper flange 20 of mounting plate 12. Upon lifting the lift arms 18, as depicted in FIG. 1b, it is noted that the normal lifting action tends to cause the lower portion of mounting plate 12 to approach lower portion of attachment plate 16 and to force engagement pin 22 toward mouths 74 of rotating clevises 36,38 of automatic latching mechanism 32.

Referring to FIG. 2a, if engagement pin 22 approaches automatic latching mechanism 32 in an off center fashion, the intermeshing of mouths 74 of rotating clevises 36,38, as they rotate, tends to force the engagement pin 22 into a centered position, as is apparent in FIGS. 2b and 2c. FIG. 2b depicts a first locked position of the automatic latching mechanism 22. In this position, the outer jaws 72 of upper and lower rotating clevises 36,38 are closed with relation to housing 34 and engagement pin 22 is prevented from exiting their mouths 74. Referring to FIG. 2b note that the opening receiving dimension R of overlapped clevis mouths 74 is at least twice as large as the diameter D of engagement pin 22. Preferably, receiving dimension R is about three times as large as engagement pin diameter D.

Referring to FIG. 2b, locking block 40 engages into first locking notches 80 toward which it is biased by springs 44, and prevents rotating clevises 36,38 from rotating outward until it is removed. This position serves as a safety feature holding the attachment plate 16 and mounting plate 12 together, if they are prevented, by an obstruction, from reaching a second locked position as depicted in FIG. 2c.

Upon further inward travel of the engagement pin 22, as depicted in FIG. 2c, the rotating clevises will achieve the second locked position. At this point, locking block 40 engages second locking notches 82 and the outer jaws 72 and inner jaws 70 of rotating clevises 36,38 are fully interlocked. Engagement pin 22 is securely positioned and cradled within bay 56. At this point in the operation of automatic latching mechanism 32, pin 22 is held with great strength and attachment plate 16 and mounting plate 12 are firmly secured together until locking block 40 is released by the operator.

When it is desired to remove the attachment 14 from the loader lift arms 18, the machine operator manipulates a remote actuator (not shown) connected to the release actuator 64 at remote actuator holes 68, which then applies a force to the release actuator 64 causing it to pivot about release actuator pivot post 66. Locking block release mechanism 42 is thereby moved, overcoming the bias of springs 44, and disengaging the locking block 40 from first or second locking notches 80,82. Springs 44 then bias upper and lower rotating clevises 36,38 to rotate outward, thus releasing engagement pin 22. Attachment plate 16 and mounting plate 12 may then be separated by manipulation of the loader lift arms 18.

Figure 4:
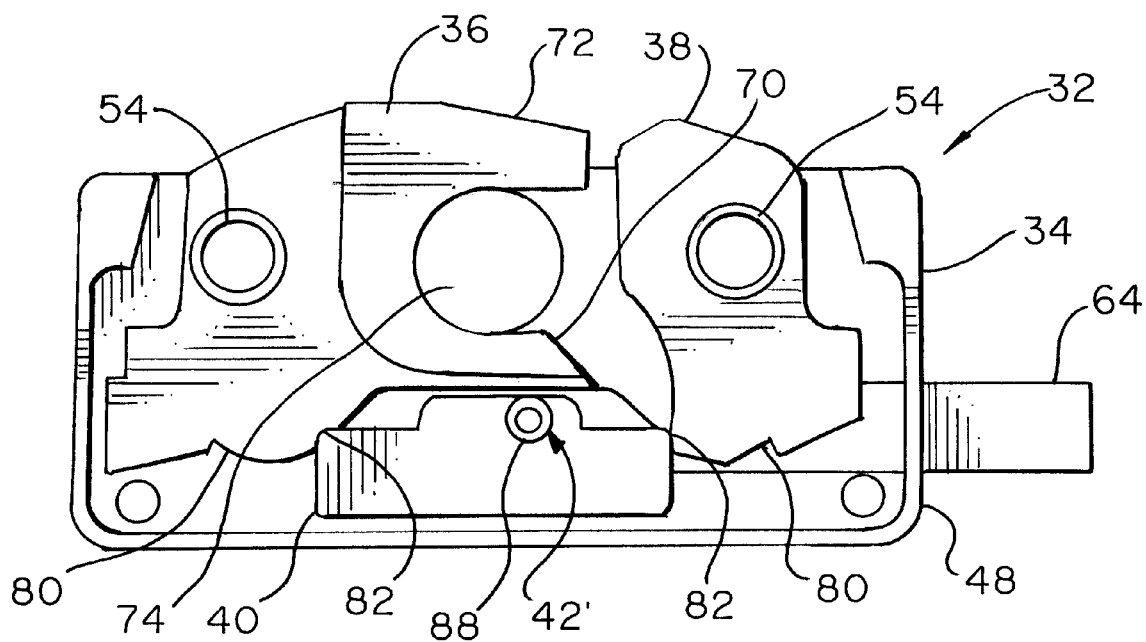
FIG. 4 is a top plan view of an alternate embodiment of a latching mechanism in the second locked position with the cover removed.

Referring to FIG. 4, in an alternate embodiment, the application of force by a remote actuator (not shown) applied to release actuator 64 is transmitted to a ramped slider assembly 88 which overcomes the bias of springs (not shown) to disengage locking block 40 from the locking notches 80,82. Locking block 40 may be disengaged by other means without departing from the spirit and scope of the invention.

The opening of the mouths 74 of rotating clevises 36,38 by the bias of springs 44 tends to clear them of any debris that may be present thereby making the automatic latching mechanism self cleaning.

The present invention may be embodied in other specific forms without departing from the essential attributes thereof; therefore, the illustrated embodiments should be considered in all respects as illustrative and not restrictive, reference being made to the appended claims rather than to the foregoing description to indicate the scope of the invention.

What is claimed is:

1. A latching mechanism for coupling a working attachment to a mobile base power unit having an operator's position, comprising:

at least one engagable member, having a diameter, operably, fixedly coupled to one of said working attachment or said mobile base power unit;

an engagable member receiving unit, operably fixedly coupled to the other of said mobile base power unit or said working attachment, said engagable member receiving unit including a first rotating clevis, having a first inner jaw and a first outer jaw defining a first mouth and a second rotating clevis having a second inner jaw and a second outer jaw defining a second mouth, each rotating clevis being rotationally shiftable through an angle greater than about forty five degrees from an engagable member receiving configuration to an engagable member retaining configuration, said first mouth and said second mouth having a width closely approximating said engagable member diameter and said first mouth and said second mouth overlap to form an engagable member receiving area.

2. The latching mechanism as claimed in claim 1, said first rotating clevis and said second rotating clevis oriented and adapted such that shifting from said engagable member receiving configuration to said engagable member retaining configuration tends to force said engagable member received within said engagable member receiving area to a location substantially centered between said first rotating clevis and said second rotating clevis.

3. The latching mechanism as claimed in claim 1, said engagable member receiving area having a least width in which said least width is at least twice said engagable member diameter.

4. The latching mechanism as claimed in claim 1, in which said engagable member retaining unit is further shiftable to a configuration intermediate said engagable member receiving configuration and said engagable member retaining configuration.

5. The latching mechanism as claimed in claim 1, in which the act of lifting said working attachment by said mobile base power unit causes the shifting of said engagable member receiving unit from said engagable member receiving configuration to said engagable member retaining configuration.

6. The latching mechanism as claimed in claim 1, in which said engagable member and said engagable member receiving unit need only approximate alignment for said engagable member to be received into said engagable member receiving unit.

7. The latching mechanism as claimed in claim 1, further comprising a release actuating mechanism adapted for shifting said engagable member receiving unit from said engagable member retaining configuration to said engagable member receiving configuration, operable from said operator's position whereby an operator may uncouple said working attachment from said mobile base power unit while remaining in said operator's position.

8. A modular system for manipulating materials, including:

a mobile base power unit, having an operator's position;

at least one working tool; and an attachment mechanism for releasably coupling said working tool to said mobile base power unit adapted so that an operator of said mobile base power unit may couple and uncouple said working tools with said mobile base power unit while remaining in said operator's position, said attachment mechanism comprising at least one engagable member, having a diameter, operably, fixedly coupled to one of said working attachment or said mobile base power unit;

an engagable member receiving unit, operably fixedly coupled to the other of said mobile base power unit or said working attachment, said engagable member receiving unit including a first rotating clevis, having a first inner jaw and a first outer jaw defining a first mouth and a second rotating clevis having a second inner jaw and a second outer jaw defining a second mouth, each rotating clevis being rotationally shiftable through an angle greater than about forty five degrees from an engagable member receiving configuration to an engagable member retaining configuration, said first mouth and said second mouth having a width closely approximating said engagable member diameter and said first mouth and said second mouth overlap to form an engagable member receiving area.

9. The system as claimed in claim 8, said attachment mechanism being further adapted so that said mobile base power unit need attain only approximate alignment with any of said working tools in order to achieve coupling of said mobile base power unit with said working tools.

10. The system as claimed in claim 9, said attachment mechanism comprising:

an engagable member, operably, fixedly secured to said working tool or to said mobile base power unit;

a latching mechanism operably, fixedly secured to the other of said plurality of working tools or said mobile base power unit, including a first rotating clevis, said latching mechanism being shiftable from an engagable member receiving position to an engagable member holding position.

11. The system as claimed in claim 10, said latching mechanism including a first rotating clevis and a second rotating clevis adapted for forcing said engagable member to a centered position therebetween as said latching mechanism shifts from said engagable member receiving position to said engagable member holding position.

12. The system as claimed in claim 10, said mobile base power unit being capable of lifting said working tool, in which the act of lifting said working tool causes said latching mechanism to shift from said engagable member receiving position to said engagable member holding position.

13. The system as claimed in claim 10, said latching mechanism being shiftable to a position intermediate said engagable member receiving position and said engagable member holding position.

14. The system as claimed in claim 11, said first rotating clevis and said second rotating clevis each further including a first locking notch and a second locking notch, said latching mechanism further comprising a locking block adapted to selectively engage and disengage said first locking notches and said second locking notches whereby said rotating first rotating clevis and said second rotating clevis may be secured in said engagable member receiving, holding and intermediate positions.

15. The system as claimed in claim 14, said latching mechanism further comprising a remotely operable actuating mechanism adapted for actuating said engagement and disengagement of said locking block from said first and second locking notches whereby said operator, while remaining in said operator's position, may couple and uncouple said working tools with said mobile base power unit.

16. A latching mechanism for coupling a working attachment to a mobile base power unit having an operator's position, comprising:

at least one engagable member, having a diameter, operably, fixedly coupled to one of said working attachment or said mobile base power unit;

an engagable member receiving unit, operably fixedly coupled to the other of said mobile base power unit or said working attachment, said engagable member receiving unit including a first rotating clevis, having a first inner jaw and a first outer jaw defining a first mouth and a second rotating clevis having a second inner jaw and a second outer jaw defining a second mouth, each rotating clevis being rotationally shiftable from an engagable member receiving configuration to an engagable member retaining configuration, said first mouth and said second mouth having a width closely approximating said engagable member diameter and said first mouth and said second mouth overlapping to form an engagable member receiving area having a narrowest dimension which is at least twice the engagable member diameter when said first and second clevises are in the engagable member receiving configuration; and a locking member to positively secure the first rotating clevis and the second rotating clevis in the engagable member retaining configuration.

17. The latching mechanism as claimed in claim 16, in which each said outer jaw has a length and each said inner jaw has a length and said length of each said outer jaw is greater than the length of each said inner jaw.

18. The latching mechanism as claimed in claim 16, in which said first rotating clevis further comprises a first pivot and said second rotating clevis further comprises a second pivot such that when said first and said second rotating clevises are in said engagable member retaining configuration said engagable member is substantially centered between said first pivot and said second pivot.

19. The latching mechanism as claimed in claim 16, in which each said inner jaw terminates in an end beveled inwardly toward each said mouth.

20. The latching mechanism as claimed in claim 16, in which each said first and second rotating clevis further comprises a first locking notch and a second locking notch adapted to receive a locking block whereby said first and second rotating clevises are positively secured in the engagable member retaining configuration and positively secured in an additional configuration intermediate the engagable member receiving configuration and said engagable member retaining configuration.

21. The latching mechanism as claimed in claim 16, in which the act of lifting said working attachment by said mobile base power unit causes the shifting of said engagable member receiving unit from said engagable member receiving configuration to said engagable member retaining configuration.

22. The latching mechanism as claimed in claim 16, in which said engagable member and said engagable member receiving unit need only approximate alignment for said engagable member to be received into said engagable member receiving unit.

23. The latching mechanism as claimed in claim 16, further comprising a release actuating mechanism adapted for shifting said engagable member receiving unit from said engagable member retaining configuration to said engagable member receiving configuration, operable from said operators position whereby an operator may uncouple said working attachment from said mobile base power unit while remaining in said operators position.

24. The latching mechanism as claimed in claim 16, further comprising biasing members whereby said first and second rotating clevises are biased towards said engagable member receiving configuration.

25. A latching mechanism for coupling a working attachment to a mobile base power unit having an operator's position, comprising:

at least one engagable member, having a diameter, operably, fixedly coupled to one of said working attachment or said mobile base power unit;

an engagable member receiving unit, operably fixedly coupled to the other of said mobile base power unit or said working attachment, said engagable member receiving unit including a first rotating clevis, having a first inner jaw and a first outer jaw defining a first mouth and a second rotating clevis having a second inner jaw and a second outer jaw defining a second mouth, each rotating clevis being rotationally shiftable from an engagable member receiving configuration to a first engagable member retaining configuration, and further rotationally shiftable to a second engagable member retaining configuration; and a locking member to positively secure the first rotating clevis and the second rotating clevis in the first engagable member retaining configuration or second engagable member retaining configuration.

26. The latching mechanism as claimed in claim 25, in which the locking member comprises a first locking notch and a second locking notch defined in each said first and second rotating clevis, said first locking notch and second locking notch adapted to receive a locking block whereby said first and second rotating clevises are positively secured in the first engagable member retaining configuration and positively secured in the second engagable member retaining configuration, the second engagable member retaining configuration being intermediate the engagable member receiving configuration and said engagable member retaining configuration.

27. The latching mechanism as claimed in claim 25, said first mouth and said second mouth having a width closely approximating said engagable member diameter and said first mouth and said second mouth overlapping to form an engagable member receiving area having a narrowest dimension which is at least twice the engagable member diameter when said first and second clevises are in the engagable member receiving configuration.

28. The latching mechanism as claimed in claim 25, in which the act of lifting said working attachment by said mobile base power unit causes the shifting of said engagable member receiving unit from said engagable member receiving configuration to said engagable member retaining configuration.

29. The latching mechanism as claimed in claim 25, in which said engagable member and said engagable member receiving unit need only approximate alignment for said engagable member to be received into said engagable member receiving unit.

30. The latching mechanism as claimed in claim 25, further comprising a release actuating mechanism adapted for shifting said engagable member receiving unit from said engagable member retaining configuration to said engagable member receiving configuration, operable from said operators position whereby an operator may uncouple said working attachment from said mobile base power unit while remaining in said operators position.

* * * * *